US009087220B2

(12) United States Patent
Chang et al.

(10) Patent No.: US 9,087,220 B2
(45) Date of Patent: Jul. 21, 2015

(54) NONVOLATILE MEMORY CELL WITH AUTHENTICATION KEY STORAGE

(75) Inventors: Sang Hoan Chang, Suwon-si (KR); Kwang Jin Lee, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 376 days.

(21) Appl. No.: 13/450,578

(22) Filed: Apr. 19, 2012

(65) Prior Publication Data

US 2013/0014269 A1    Jan. 10, 2013

(30) Foreign Application Priority Data

Jul. 8, 2011  (KR) ........................ 10-2011-0068075

(51) Int. Cl.
    G06F 21/79      (2013.01)
(52) U.S. Cl.
    CPC ..................................... G06F 21/79 (2013.01)
(58) Field of Classification Search
    CPC ...................................................... G06F 21/79
    See application file for complete search history.

(56) References Cited

U.S. PATENT DOCUMENTS

| 6,226,199 | B1 | 5/2001 | Ichikawa | |
|---|---|---|---|---|
| 6,996,692 | B2 | 2/2006 | Kouno | |
| 7,383,445 | B2 | 6/2008 | Tomohiro | |
| 7,450,414 | B2 | 11/2008 | Scheuerlein | |
| 2004/0010702 | A1* | 1/2004 | Lewis | 713/194 |
| 2006/0095699 | A1* | 5/2006 | Kobayashi et al. | 711/164 |
| 2010/0241868 | A1* | 9/2010 | Nachef et al. | 713/186 |
| 2012/0147655 | A1* | 6/2012 | Lee | 365/148 |

OTHER PUBLICATIONS

IBM, DS8000 Information Center: Section DS8000 disk encryption, printed out in year 2013.*
Hardware Announcement; Oct. 31, 2006; IBM System Storage DS8000 series offers a one-year Enterprise Choice length of warranty; year 2006.*
Memory protection—Wikipedia, the free encyclopedia, printed out year 2013.*
Review: 7 secure USB drives; Should you trust these flash drives to safeguard your data? by Bill O'Brien, Rich Ericson and Lucas Mearian; Mar. 3, 2008 12:01 AM ET.*
Towards Phase Change Memory as a Secure Main Memory; André Seznec; Nov. 2009.*

* cited by examiner

Primary Examiner — Linglan Edwards
Assistant Examiner — Kevin Bechtel
(74) Attorney, Agent, or Firm — Onello & Mello, LLP.

(57) ABSTRACT

A nonvolatile memory device includes a memory cell array configured to store an authentication key and authentication key configuration information in first and second pluralities of nonvolatile memory cells, along with data whose security is to be protected, and a control circuit controlling an operation of the memory cell array.

12 Claims, 14 Drawing Sheets

NONVOLATILE MEMORY CELL WITH AUTHENTICATION KEY STORAGE

CROSS-REFERENCE TO RELATED APPLICATION

This application claims priority under 35 U.S.C. §119(a) from Korean Patent Application No. 10-2011-0068075 filed on Jul. 8, 2011, the disclosure of which is hereby incorporated by reference in its entirety.

BACKGROUND

Exemplary embodiments, in accordance with principles of inventive concepts relate to a nonvolatile memory device, and more particularly, to a nonvolatile memory device for implementing an authentication key and a memory system having the same.

An authentication key may be used for security purposes, particularly in devices that employ nonvolatile memory devices. Although the use of an authentication key may be critical to the security of systems employing nonvolatile memory devices, storage of and access to authentication key configuration information may significantly increase a memory system's overhead.

SUMMARY

In an exemplary embodiment in accordance with principles of inventive concepts a nonvolatile memory device, includes a memory cell array configured for storing authentication key and configuration information of the authentication key in first and second pluralities of nonvolatile memory cells, and a control circuit controlling an operation of the memory cell array.

In accordance with principles of inventive concepts when the memory cell array is divided by a plurality of partitions, the authentication key and data requiring security are stored in one of the plurality of partitions.

In an exemplary embodiment in accordance with principles of inventive concepts configuration information of the authentication key includes an authentication enable bit for enabling or disabling the authentication key or a lock down bit for locking the authentication key and the authentication enable bit.

In an exemplary embodiment in accordance with principles of inventive concepts the control circuit includes a register where the nonvolatile memory device copies and stores the authentication key and the configuration information of the authentication key stored in the memory cell array according to a power up, a reset or an external command.

In an exemplary embodiment in accordance with principles of inventive concepts the nonvolatile memory device may be a phase change random access memory (PRAM).

In an exemplary embodiment in accordance with principles of inventive concepts a system, includes the nonvolatile memory device and a memory controller controlling the nonvolatile memory device.

In an exemplary embodiment in accordance with principles of inventive concepts the system is a memory card.

In an exemplary embodiment in accordance with principles of inventive concepts, the system is a multi-chip package.

In an exemplary embodiment in accordance with principles of inventive concepts a nonvolatile memory device includes a first plurality of nonvolatile memory cells configured to store an authentication key information and a second plurality of nonvolatile memory cells configured to store authentication key configuration information.

In an exemplary embodiment in accordance with principles of inventive concepts the first plurality of nonvolatile and the second plurality of nonvolatile memory cells are divided into a plurality of partitions respectively, and the authentication key is stored along with data requiring security in one of the plurality of partitions.

In an exemplary embodiment in accordance with principles of inventive concepts the authentication key configuration information comprises an authentication enable bit for enabling the authentication key.

In an exemplary embodiment in accordance with principles of inventive concepts the authentication key configuration information comprises a lock down bit for locking the authentication key and the authentication enable bit.

In an exemplary embodiment in accordance with principles of inventive concepts a control circuit includes a register where the nonvolatile memory device is configured to copy and store the authentication key and the authentication key configuration information from the first plurality of nonvolatile memory cells and the second plurality of nonvolatile memory cells in response to a reset.

In an exemplary embodiment in accordance with principles of inventive concepts a control circuit includes a register where the nonvolatile memory device is configured to copy and store the authentication key and the authentication key configuration information from the first plurality of nonvolatile memory cells and the second plurality of nonvolatile memory cells in response to an external command.

In an exemplary embodiment in accordance with principles of inventive concepts the nonvolatile memory device is a phase change random access memory (PRAM).

In an exemplary embodiment in accordance with principles of inventive concepts a system includes a nonvolatile memory device and a memory controller configured to control the nonvolatile memory device, wherein the nonvolatile memory device includes a first plurality of nonvolatile memory cells configured to store authentication key information and a second plurality of nonvolatile memory cells configured to store authentication key configuration information.

In an exemplary embodiment in accordance with principles of inventive concepts the first plurality of nonvolatile memory cells and the second plurality of nonvolatile memory cells are divided into a plurality of partitions, and the authentication key is stored, along with data requiring security, in one of the plurality of partitions.

In an exemplary embodiment in accordance with principles of inventive concepts the authentication key configuration information comprises an authentication enable bit for enabling the authentication key.

In an exemplary embodiment in accordance with principles of inventive concepts a nonvolatile memory device is a phase change random access memory (PRAM).

In an exemplary embodiment in accordance with principles of inventive concepts the memory system is a memory card.

In an exemplary embodiment in accordance with principles of inventive concepts the memory system is a multi-chip package.

In an exemplary embodiment in accordance with principles of inventive concepts the memory system is a smart phone or tablet PC.

In an exemplary embodiment in accordance with principles of inventive concepts the memory system is a universal serial bus memory drive.

In an exemplary embodiment in accordance with principles of inventive concepts a method includes storing authentication key in a first plurality of nonvolatile memory cells and storing authentication key configuration information in a second plurality of nonvolatile memory cells.

In an exemplary embodiment in accordance with principles of inventive concepts the first plurality of nonvolatile memory cells and the second plurality of nonvolatile memory cells are divided into a plurality of partitions respectively, and the step of storing the authentication key includes storing data requiring security in one of the plurality of partitions.

In an exemplary embodiment in accordance with principles of inventive concepts storing the authentication key configuration information comprises storing an authentication enable bit for enabling the authentication key.

In an exemplary embodiment in accordance with principles of inventive concepts storing the authentication key configuration information comprises storing a lock down bit for locking the authentication key and the authentication enable bit.

In an exemplary embodiment in accordance with principles of inventive concepts a the method further comprises copying and storing the authentication key and the authentication key configuration information from the first plurality of nonvolatile memory cells and the second plurality of nonvolatile memory cells in response to a reset.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION

Figure 1:
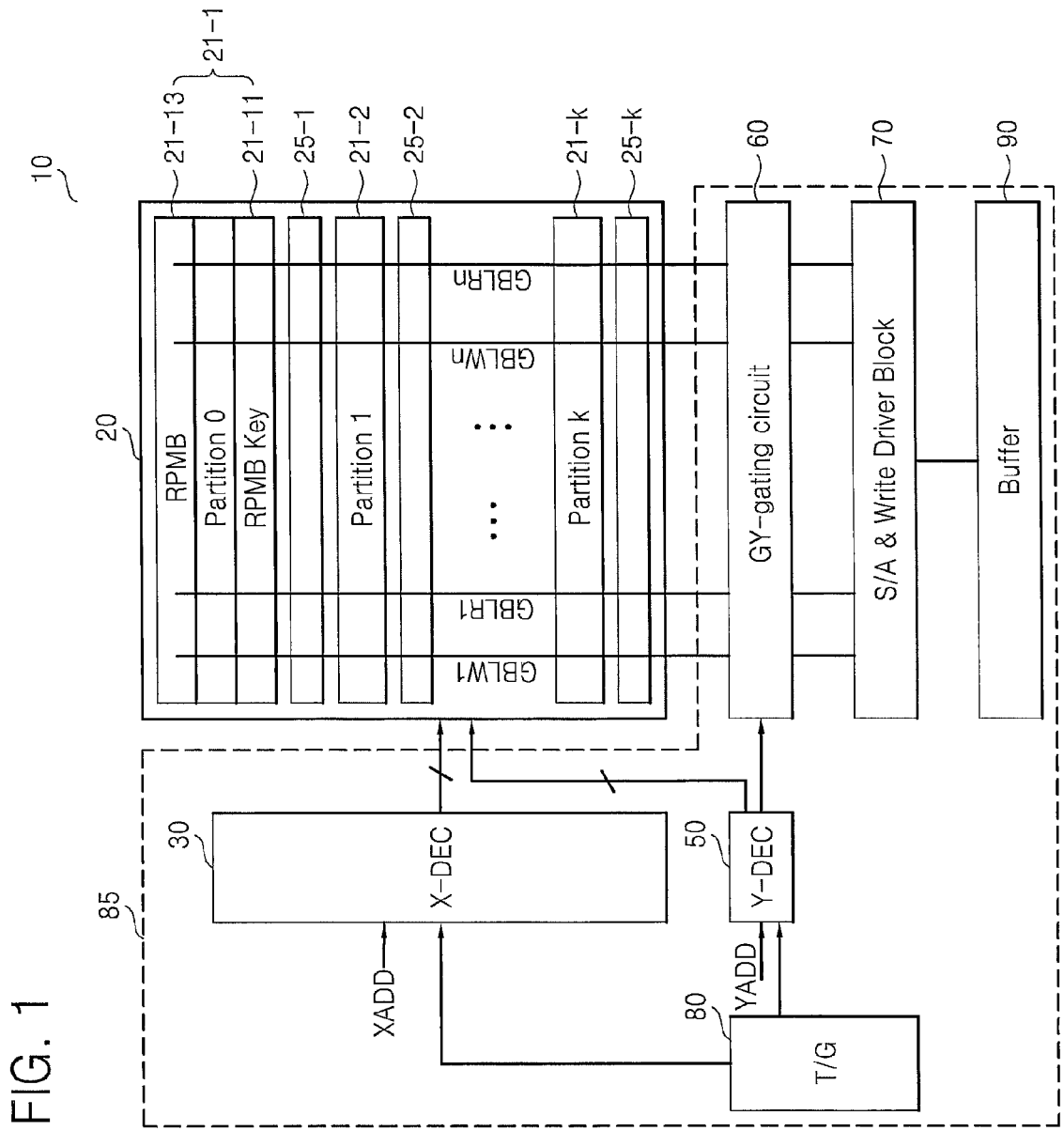
FIG. 1 is a block diagram of a nonvolatile memory device according to an exemplary embodiment in accordance with principles of inventive concepts.

Exemplary embodiments of the inventive concepts will now be described more fully with reference to the accompanying drawings, in which exemplary embodiments of the inventive concept are shown. Exemplary embodiments of the inventive concept may, however, be embodied in many different forms and should not be construed as limited to the embodiments set forth herein; rather, these exemplary embodiments of the inventive concept are provided so that this description will be thorough and complete, and will fully convey the concept of exemplary embodiments of the inventive concept to those of ordinary skill in the art. In the drawings, the thicknesses of layers and regions are exaggerated for clarity. Like reference numerals in the drawings denote like elements, and thus their description will be omitted.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated, for example, 90 degrees or at other orientations) and the spatially relative descriptors used herein interpreted accordingly.

The terminology used herein is for the purpose of describing particular exemplary embodiments of the inventive concept only and is not intended to be limiting of the inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the inventive concept are described herein with reference to cross-sectional illustrations that are schematic illustrations of idealized exemplary embodiments of the inventive concept (and intermediate structures). As such, variations from the shapes of the illustrations as a result, for example, of manufacturing techniques and/or tolerances, are to be expected. Thus, exemplary embodiments of the inventive concept should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The block diagram of FIG. 1 illustrates an exemplary embodiment of a nonvolatile memory in accordance with principles of inventive concepts. The circuit diagram of FIG. 2 will be used to discuss the operation of a nonvolatile memory such as that depicted in FIG. 1.

Non-volatile memory device 10 includes a memory cell array 20 and a control circuit 85. Non-volatile memory device 10 may include an Electronically Erasable Programmable Read-Only Memory (EEPROM), a flash memory, a Ferroelectric RAM (FeRAM or FRAM), a Magnetoresistive Random Access memory (MRAM), Spin-Transfer Torque MRAM (STT-MRAM), a Phase change Random Access Memory (PRAM), a Resistive random-access memory (RRAM) or a Nano-RAM (NRAM), for example.

Memory cell array 20 includes a plurality of partitions 21-1, 21-2, . . . through 21-$k$, a plurality of global bit lines GBLW1, GBLR1, . . . , GBLWn through GBLRn, and a plurality of local bit line selection circuits 25-1, 25-2, . . . through 25-$k$, where k and n are integers.

Data may be written or read on a partition by partition basis. For example, first data may be written in a partition 21-1, second data may be written in a partition 21-2, etc. In an exemplary embodiment in accordance with principles of inventive concepts each of the plurality of partitions 21-1, 21-2, . . . , and 21-$k$ may be substantially the same as one another, and a detailed description of first partition 21-1 may apply to all partitions 21-1 through 21-$k$.

In an exemplary embodiment in accordance with principles of concepts, first partition 21-1 includes a plurality of nonvolatile memory cells 23. Each of the plurality of nonvolatile memory cells 23 may be connected to each of a plurality of local bit lines LBL11 to LBL1$j$ and each of a plurality of word lines WL11 to WL1$n$. The plurality of local bit lines LBL11 to LBL1$j$ may be connected to a global bit line GBLW1 and a read global bit line GBLR1.

Write data may be written in partition 21-1 through write global bit line GBLW1 and read data may be read from partition 21-1 through read global bit line GBLR1. Each of the plurality of global bit lines GBLW1, GBLR1, . . . , GBLWn and GBLRn may be selected according to each of a plurality of global bit line selection signals GY1 to GYm output from column decoder 50.

Local bit line selection circuit 25-1 may include a plurality of switches 26-11 to 26-2$j$, (where j is an integer) and each of the plurality of switches 26-11 to 26-2$j$ connects each of the plurality of bit lines LBL11 to LBL1$j$ to write global bit line GBLW1 or read global bit line GBLR1 according to each of a plurality of local bit line selection signals LY11 to LY2$j$ output from column decoder 50.

In accordance with principles of inventive concepts, each of the plurality of switches 26-1 to 26-2$j$ may be implemented as a PMOS transistor. For example, a first group of switches 26-11 to 26-1$j$ used for a write operation may be connected between write global bit line GBLW1 and each local bit line LBL11 to LBL1$j$, and a second group of switches 26-21 to 26-2$j$ may be connected between read global bit line GBLR1 and each local bit lines LBL11 to LBL1$j$.

In an exemplary embodiment in accordance with principles of inventive concepts, a pair of switches 26-11 and 26-21, 26-12 and 26-22, and 26-1$j$ and 26-2$j$ are not turned on at the same time. However, to perform read-while write operation, each switch 26-11 and 26-22, or 26-12 and 26-21 connected to each of different local bit lines LBL11 and LBL12 may be turned on simultaneously.

Each of the plurality of nonvolatile memory cells 23 is a memory cell which may store data by using a phase change material, such as Ge—Sb—Te (GST) for example and may include a memory element and a select element. In an exemplary embodiment in accordance with principles of inventive concepts phase change material may employ two stable states, i.e., a crystalline state and an amorphous state to represent two logic states.

Figure 2:
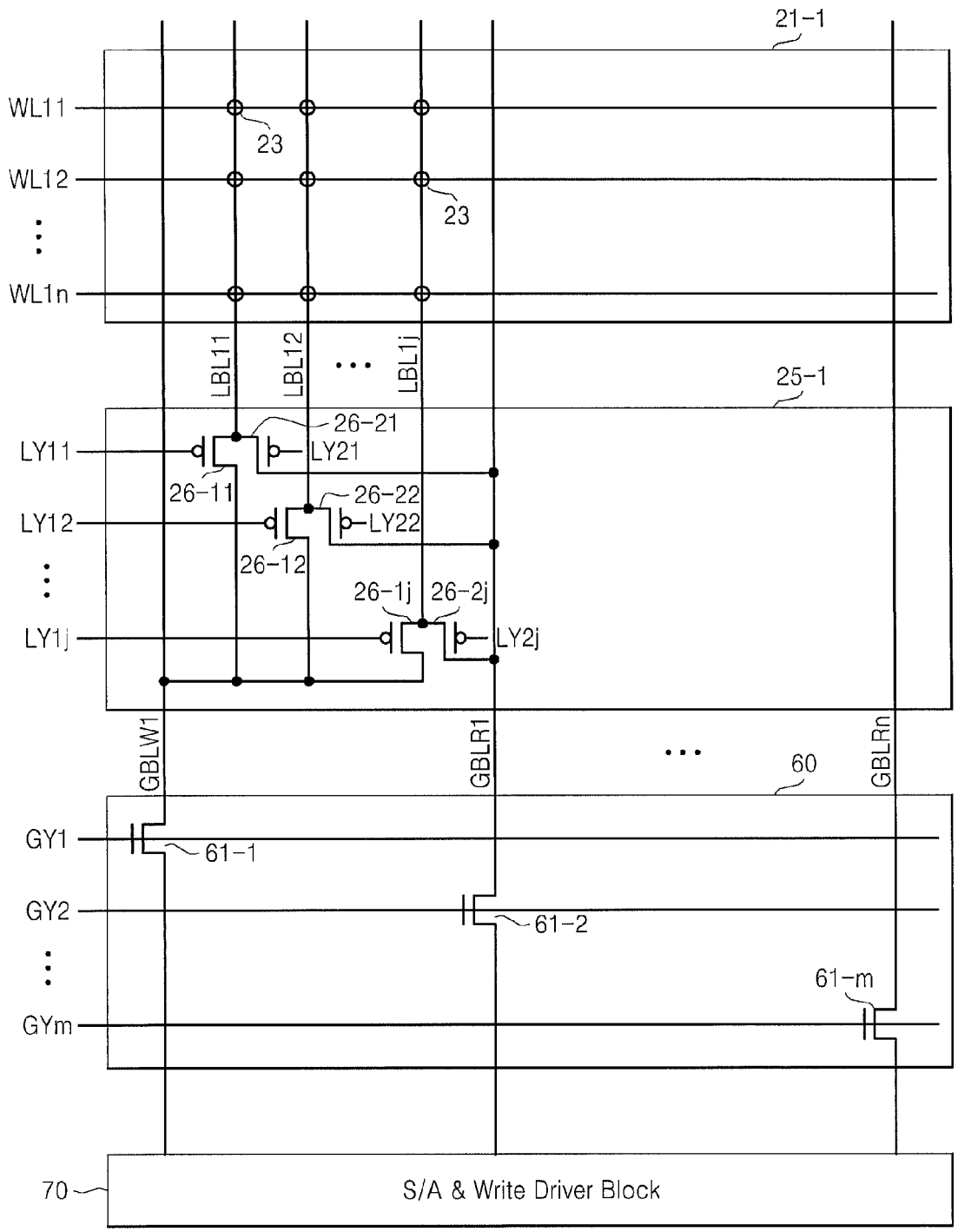
FIG. 2 is a circuit diagram for explaining an operation of the nonvolatile memory device illustrated in FIG. 1 in detail.
Figure 3:
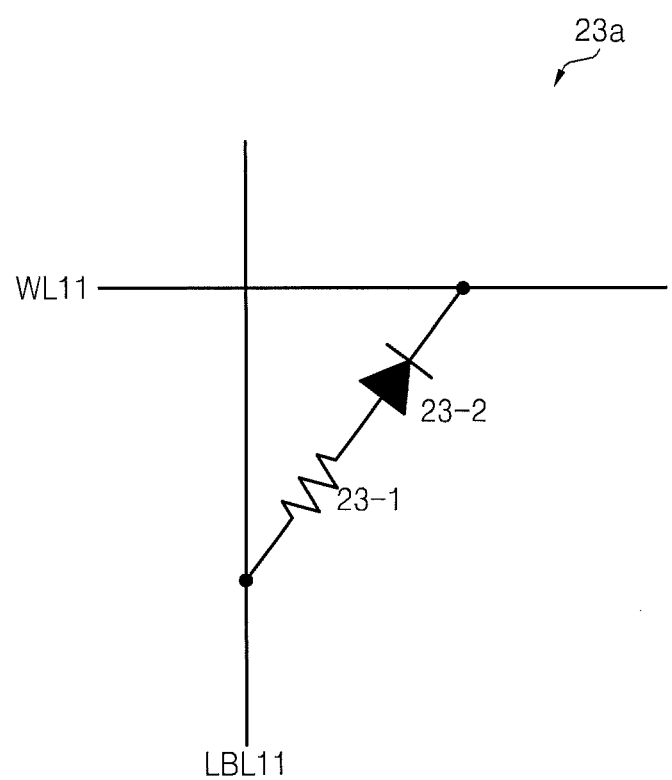
FIG. 3 is an example embodiment of the nonvolatile memory cell illustrated in FIG. 2.

The schematic diagram of FIG. 3 represents an exemplary embodiment, in accordance with principles of inventive concepts of a nonvolatile memory device illustrated in FIG. 2. Non-volatile memory cell 23$a$ may include a memory element 23-1 and a select element 23-2 connected in series between a local bit line LBL11 and a word line WL11. In this exemplary embodiment, phase change material GST is used as active material in memory element 23-1 and a diode is used as select element 23-2.

That is, an anode of diode 23-2 is connected to memory element 23-1 and a cathode of diode 23-2 is connected to the word line WL11. When a voltage difference between the anode and the cathode of the diode 23-2 is higher than a threshold voltage of the diode 23-2, the memory element 23-1 of a nonvolatile memory cell 23$a$ may be supplied with a program current, e.g., a set current or a reset current, through a local bit line LBL11, for example.

Figure 4:
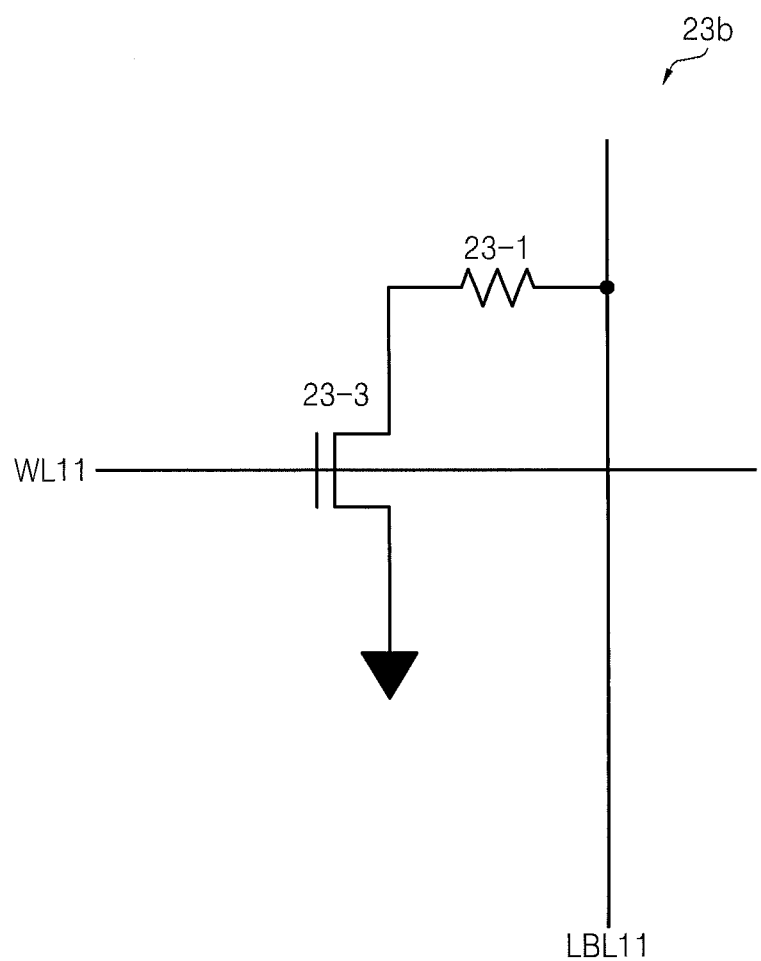
FIG. 4 is another example embodiment of the nonvolatile memory cell illustrated in FIG. 2.

FIG. 4 is another exemplary embodiment of a memory cell illustrated in FIG. 2. Non-volatile memory cell 23b includes a memory element 23-1 and a select element 23-3 connected in series between local bit line LBL11 and a supply line, e.g., a ground line supplying a ground voltage or a supply line supplying a predetermined voltage. In this exemplary embodiment in accordance with principles of inventive concepts phase change material, such as, GST may be used in memory element 23-1 and a transistor may be used as select element 23-3.

When a voltage supplied to a word line WL11 is higher than a threshold voltage of transistor 23-3, memory element 23-1 of nonvolatile memory cell 23b may be supplied with a program current, e.g., a set current or a reset current, through the local bit line LBL11.

Returning to FIGS. 1 and 2, a control circuit 85 may control operation of memory cell array 20. Control circuit 85 includes a row decoder 30, a column decoder 50, a Y-gating circuit 60, a sense amplifier and write driver block 70, a timing generator 80, and a buffer 90.

Row decoder 30 decodes row addresses XADD and drives selectively one of a plurality of word lines WL11 to WL1n of memory cell array 20, according to a decoding result.

Column decoder 50 decodes column addresses YADD and outputs a plurality of global bit line selection signals GY1 to GYm and a plurality of local bit line selection signals LY11 to LY2j, according to a decoding result.

In this exemplary embodiment in accordance with principles of inventive concepts Y-gate circuit 60 controls connection between memory cell array 20 and a sense amplifier and write driver block 70 according to each of the plurality of global bit line selection signals GY1 to GYm output from column decoder 50. Each of a plurality of third switches 61-1 to 61-m included in the Y-gate circuit 60 controls connection between each of the plurality of global bit lines GBLW1 to GBLRn and the sense amplifier and write driver block 70 in response to each of the plurality of global bit line selection signals GY1 to GYm output from the column decoder 50.

Sense amplifier and write driver block 70 supplies write data to Y gate circuit 60 during a write operation or sense-amplifies read data output from the Y-gate circuit 60 during a read operation.

A timing generator 80 may generate row addresses XADD and column addresses YADD according to a command (for example, a program command and a read command) input from outside memory device 10, for example.

Non-volatile memory device 10 may use a hash algorithm for security. A hash algorithm uses an authentication key in combination with data to calculate a message authentication code (MAC). To ensure security, a host (not shown) may calculate a MAC by using a hash algorithm to operate on an authentication key and data. The host then transmits the calculated MAC and the data to nonvolatile memory device 10. Non-volatile memory device 10 then calculates a MAC using the hash algorithm to operate on the transmitted data and authentication key stored in nonvolatile memory device 10. Nonvolatile memory device 10, then compares the calculated MAC with the MAC transmitted from the host. If the MAC calculated by nonvolatile memory device 10 is identical to the MAC transmitted from the host, nonvolatile memory device 10 determines that data transmitted from the host is valid.

In exemplary embodiment in accordance with principles of inventive concepts, non-volatile memory device 10 may store authentication key (which may be 256 bits long, for example) and configuration information of the authentication key in memory cell array 20.

Configuration information of the authentication key may include an authentication enable bit or a lock down bit, for example. An authentication enable bit may be used to enable or disable the authentication key. For example, with an authentication enable bit in the first logic state (for example, logic state 1) use of the authentication key may be enabled and with an authentication enable bit in the second logic state (for example, logic state 0) use of the authentication key may be disabled.

In an exemplary embodiment in accordance with principles of inventive concepts a lock down bit in a first logic state (for example, logic state 1), an authentication key and the authentication enable bit may be locked permanently. Accordingly, in such an embodiment when the lock down bit is in the first logic state, the authentication key and the authentication enable bit may not be modified. In such an embodiment the authentication enable bit, and the authentication lock down bit may be programmed after the authentication key is written, for example.

By storing the authentication key and authentication key configuration information in memory cell array 20 of nonvolatile memory device 10, nonvolatile memory device 10 may process the configuration information of the authentication key and read or write data stored in the memory cell array 20 with a command. Accordingly, the reliability of nonvolatile memory device 10 is secured. Additionally, because separate space, such as entire partition, needn't be reserved specifically for an authentication key, nonvolatile memory device 10 may reduce the area-overhead associated with an authentication key by storing the configuration information of the authentication key in memory cell array 20.

In an exemplary embodiment in accordance with principles of inventive concepts, nonvolatile memory device 10 may store both the authentication key and data requiring security in a single partition, such as partition 21-1, for example. The authentication key may be stored in a replay protected memory block (RPMB) 21-11 and data requiring security, (for example, an ID or a password), may be stored in RPMB 21-13. Storing both the data requiring protection and authentication key within the same partition allows the data and authentication key to be accessed without modifying the partition-specific address (Y address in this exemplary embodiment), thereby increasing access speed.

In a replay attack, valid data between a host and nonvolatile memory may be intercepted, recorded, and played back again later by an attacker. A RPMB 21-11 or 21-13 may be protected against replay attacks, for example. The RPMB 21-11 or 21-13 may be implemented in a part of partition 21-1, for example. In such an exemplary embodiment, when data between a host and nonvolatile memory device 10 are authenticated by using a MAC, nonvolatile memory device 10 may use RPMB 21-11 or 21-13, for example.

When a read-while-authenticated operation is performed in nonvolatile memory device 10, nonvolatile memory device 10 may prevent a collision in a dual operation by storing data requiring security and the authentication key in an identical partition 21-1. For example, when data requiring security are stored in partition 21-1, and the authentication key and data to be read from the host are stored in another partition 21-2, the authentication key and the data, stored in the another partition 21-2, may collide against each other in a dual operation. According to an exemplary embodiment in accordance with principles of inventive concepts, an authentication key may be stored in an one time program or protect (OTP) region (not shown) instead of RPMB 21-11.

In an exemplary embodiment in accordance with principles of inventive concepts memory device 10 may copy and store an authentication key and associated configuration information of the authentication key, stored in the memory cell array 20, in a buffer 90 (which may be a register, for example) by a power up, a reset or an external command (e.g., a write or a read command).

Figure 5:
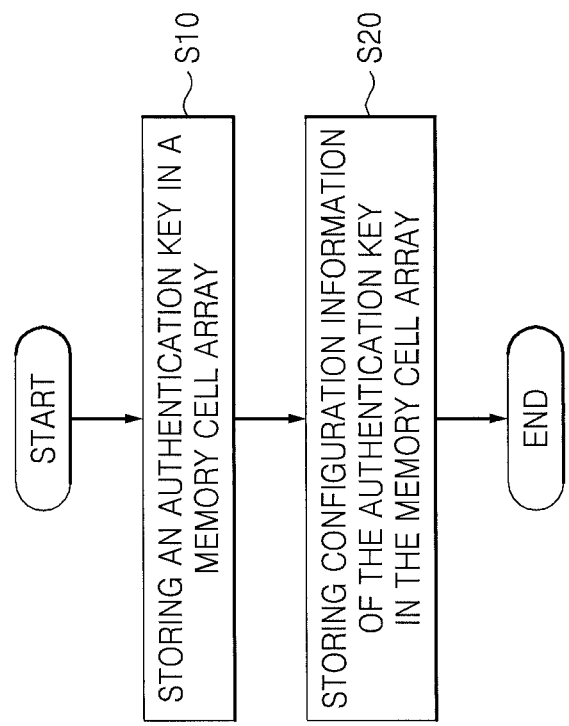
FIG. 5 is a flowchart for explaining an operation of the nonvolatile memory device illustrated in FIG. 1.

An exemplary embodiment of the operation of a nonvolatile memory, in accordance with principles of inventive concepts may be described with reference to the flowchart of FIG. 5. Non-volatile memory device 10 stores an authentication key in memory cell array 20 in step (S10).

Non-volatile memory device 10 stores configuration information of the authentication key in memory cell array 20 in step (S20). When the memory cell array 20 is divided by a plurality of partitions, the authentication key may be stored in one of the plurality of partitions where data requiring security are stored, for example.

Figure 6:
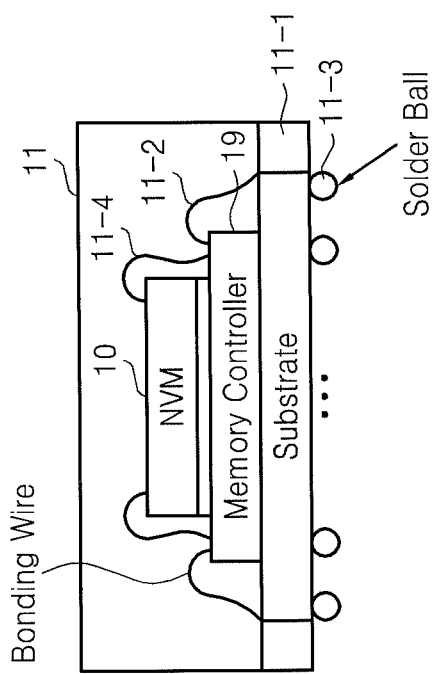
FIG. 6 is an exemplary embodiment in accordance with principles of inventive concepts of a multi-chip package including the nonvolatile memory device illustrated in FIG. 1.

The block diagram of FIG. 6 depicts an exemplary embodiment of a multichip package including a nonvolatile memory device in accordance with principles of inventive concepts. Multi-chip package 11 includes a memory controller 19 formed on a circuit substrate 11-1, (for example, a printed circuit board (PCB)), and nonvolatile memory device 10 formed on memory controller 19. Memory controller 19 may communicate with an external device through bonding wires 11-2 and solder balls 11-3. In addition, memory controller 19 and nonvolatile memory device 10 may communicate with each other through bonding wires 11-4.

Although the block diagram of FIG. 6 illustrates nonvolatile memory device 10 formed on memory controller 19 the arrangement may be modified, for example, with memory controller 19 formed on nonvolatile memory device 10. Memory controller 19 and nonvolatile memory device 10 may communicate with each other through a connection means other than bonding wires 11-4, and memory controller 19 and solder balls 11-3 may be connected to each other through a connection means other than bonding wires 11-2. The connection means may be implemented as a vertical electrical element (for example, through silicon via (TSV)).

Figure 7:
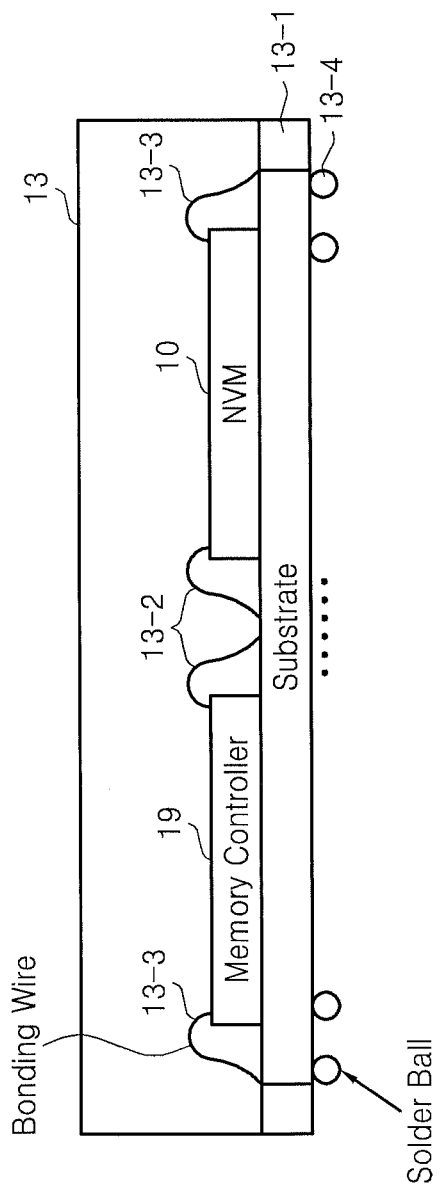
FIG. 7 is another exemplary embodiment in accordance with principles of inventive concepts of the multi-chip package including the nonvolatile memory illustrated in FIG. 1.

In the exemplary embodiment in accordance with principles of inventive concepts of FIG. 7 a multi-chip package includes nonvolatile memory device such as described in the discussion related to FIG. 1. Multi-chip package 13 includes memory controller 19 and nonvolatile memory device 10, which are formed on a circuit substrate 13-1, which may be a printed circuit board (PCB), for example. Memory controller 19 and nonvolatile memory device 10 may communicate with each other through bonding wires 13-2, for example. Memory controller 19 and nonvolatile memory device 10 may communicate with an external device through bonding wires 13-3 and solder balls 13-4.

In an exemplary embodiment in accordance with principles of inventive concepts, memory controller 19 and nonvolatile memory device 10 may communicate with each other through a connection means besides bonding wires 13-2. The connection means may be embodied in a vertical electrical element, such as a through silicon via (TSV). When memory controller 19 and nonvolatile memory device 10 are connected to circuit substrate 13-1 through TSV, memory controller 19 and nonvolatile memory device 10 may communicate with each other through TSV and the circuit substrate 13-1.

Memory controller 19 and nonvolatile memory device 10 embodied in a chip may be implemented in a package such as a Package On Package (PoP), Ball Grid Arrays (BGAs), Chip Scale Packages (CSPs), a Plastic Leaded Chip Carrier (PLCC), a Plastic Dual In-Line Package (PDIP), a Chip On Board (COB), CERamic Dual In-Line Package (CERDIP), a plastic metric quad flat pack (MQFP), a Thin Quad FlatPack (TQFP), a small-outline integrated circuit (SOIC), a shrink small outline package (SSOP), a thin small outline (TSOP), a system in package (SIP), a multi chip package (MCP), a wafer-level fabricated package (WFP) or a wafer-level processed stack package (WSP), for example.

Figure 8:
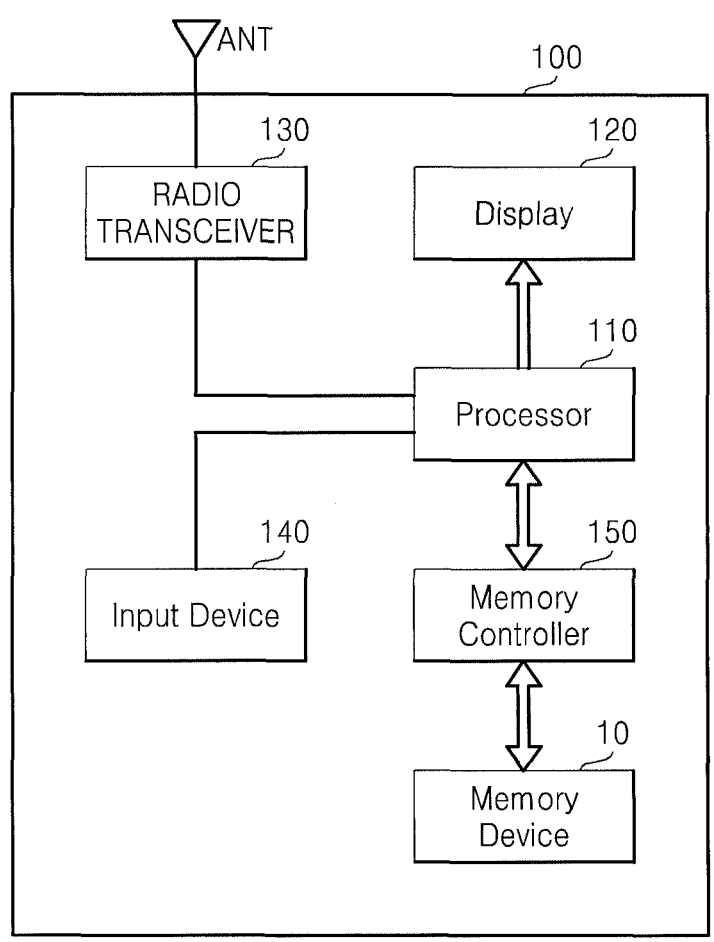
FIG. 8 is another exemplary embodiment in accordance with principles of inventive concepts of the memory system including the nonvolatile memory device illustrated in FIG. 1.

In the exemplary embodiment of FIG. 8 a memory-including system 100 includes nonvolatile memory device such as described in the discussion related to FIG. 1. Memory-including system 100, which may be a cellular phone, a smart phone or a wireless internet device, includes nonvolatile memory device 10 and memory controller 150 which may control a data processing operation (such as, a program operation or a read operation) of nonvolatile memory device 10.

Memory controller 150 may be controlled by processor 110 which controls general operation of system 100, in this exemplary embodiment. Data stored in nonvolatile memory device 10 may be displayed through a display 130 under control of memory controller 150, which in turn, operates under control of processor 110 in this exemplary embodiment.

Radio transceiver 120 may transmit or receive a radio signal through an antenna ANT. For example, radio transceiver 120 may convert a radio signal received through antenna ANT to a signal which processor 110 may process. Accordingly, processor 110 may process a signal output from radio transceiver 120 and store a processed signal in nonvolatile memory device 100 through memory controller 150 or display it through display 130, for example. Radio transceiver 120 may convert a signal output from processor 110 into a radio signal and output a converted signal to outside system 100 through antenna ANT.

Input device 140, which may input a control signal for controlling an operation of processor 110 or data to be processed by processor 110, may be implemented as a pointing device such as a touch pad and a computer mouse, a keypad or a keyboard, for example.

Processor 110 may control display 130 so that data output from nonvolatile memory device 100, a radio signal output from the radio transceiver 120 or data output from input device 140 may be displayed through display 130.

Figure 9:
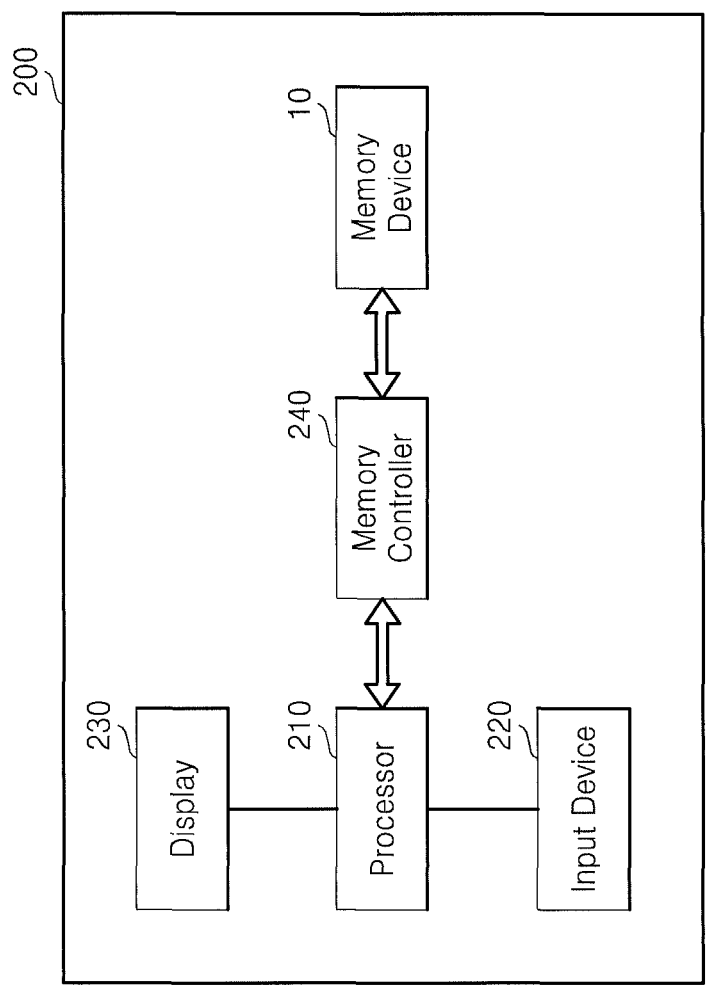
FIG. 9 is still another exemplary embodiment in accordance with principles of inventive concepts of the memory system including the nonvolatile memory device illustrated in FIG. 1.

In the exemplary embodiment in accordance with principles of inventive concepts of FIG. 9 system 200 includes nonvolatile memory device such as described in the discussion related to FIG. 1. Memory system 200, which may be included in a data processing device such as a PC, a tablet PC, a net book, an e-reader, a personal digital assistant (PDA), a portable multimedia player (PMP), a MP3 player or a MP4 player, for example, includes nonvolatile memory device 10 and memory controller 240 that may control a data processing operation of nonvolatile memory device 10.

Memory system 200 may include processor 210 for controlling the general operation of system 200. Memory controller 240 may be controlled by processor 210. Processor 210 may display data stored in nonvolatile memory device 10 through a display 230 according to an input signal received through input device 220. Input device 220 may be implemented as a pointing device such as a touch pad, a computer mouse, a keypad, or a keyboard, for example.

Figure 10:
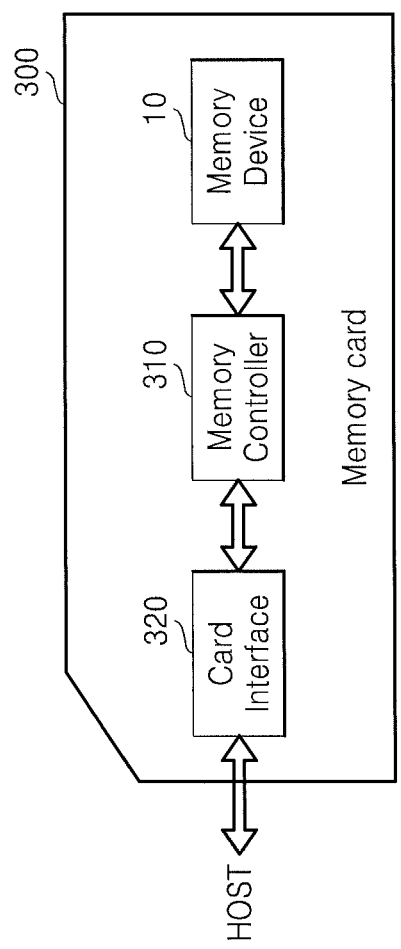
FIG. 10 is still another exemplary embodiment in accordance with principles of inventive concepts of the memory system including the nonvolatile memory device illustrated in FIG. 1.

In an exemplary embodiment in accordance with principles of physics concepts of FIG. 10 a system 300 includes a nonvolatile memory device, as described in the discussion related to FIG. 1. Memory system 300, which may be included in a memory card or a smart card, includes nonvolatile memory device 10, a memory controller 310 and card interface 320.

Memory controller 310 may control data exchange between nonvolatile memory device 10 and card interface 320. Card interface 320 may be a secure digital (SD) card interface or a multi-media card (MMC) interface, for example. Card interface 320 may interface data exchange between a host and memory controller 310 according to a host protocol.

When memory system 300 is connected to a host such as a computer, a digital camera, a digital audio player, a cellular phone, console video game hardware or a digital set-top box, the host may transmit or receive data stored in nonvolatile memory device 10 through card interface 320 and memory controller 310.

Figure 11:
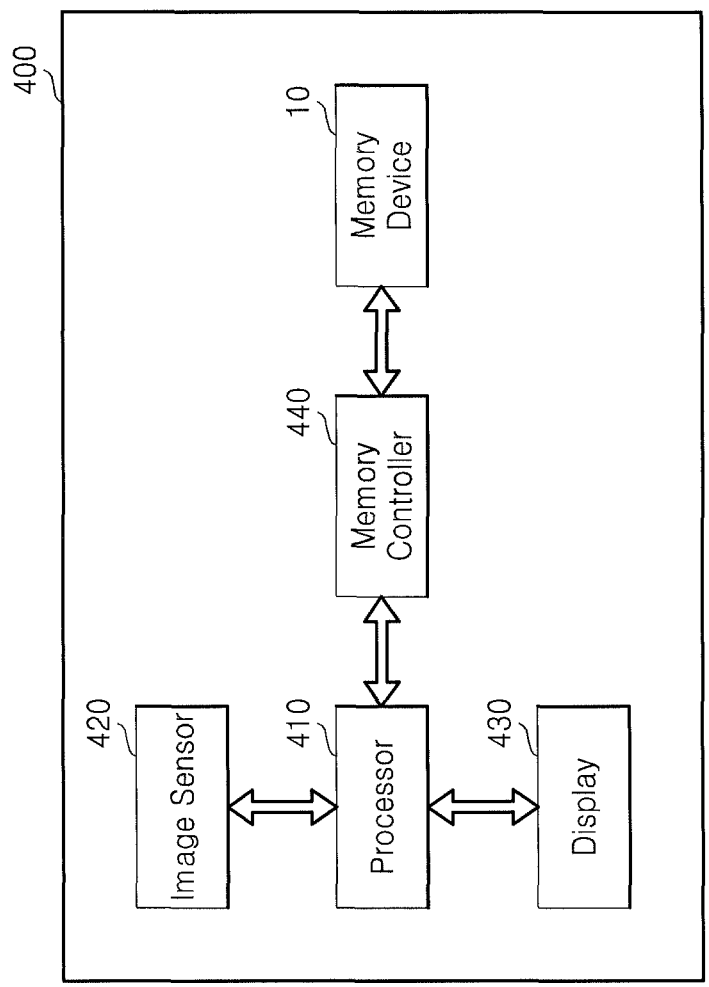
FIG. 11 is still another exemplary embodiment in accordance with principles of inventive concepts of the memory system including the nonvolatile memory device illustrated in FIG. 1.

FIG. 11 depicts another exemplary embodiment in accordance with principles of inventive concepts of a system 400 that includes a nonvolatile memory device such as described in the discussion related to FIG. 1. Memory system 400, which may be included in a digital camera or a digital camera-embedded cellular phone, includes nonvolatile memory device 10, a memory controller 440 which may control a data processing operation of nonvolatile memory device 10, and a processor 410 which may control general operation of system 400.

Image sensor 420 of system 400 may convert an optical image into digital signals, and converted digital signals may be stored in nonvolatile memory device 10 or displayed through a display 430 under a control of processor 410. In addition, digital signals stored in nonvolatile memory device 10 may be displayed through display 430, under control of processor 410.

Figure 12:
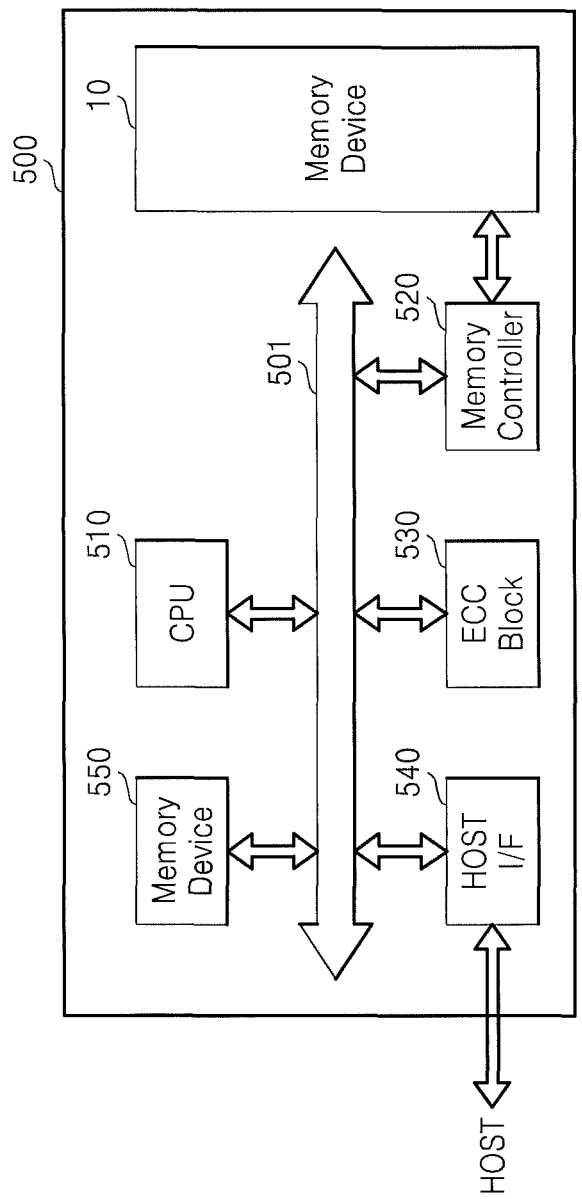
FIG. 12 is still another exemplary embodiment in accordance with principles of inventive concepts of the memory system including the nonvolatile memory device illustrated in FIG. 1.

FIG. 12 depicts an exemplary embodiment of a system in accordance with principles of inventive concepts that includes a nonvolatile memory device such as described in the discussion related to FIG. 1. System 500 includes nonvolatile memory device 10, a memory controller 520 for controlling the operation of nonvolatile memory device 10, and a CPU 510 which may control general operation of system 500.

System 500 includes a memory device 550 which may be used as an operation memory of CPU 510. Memory device 550 may be implemented as a nonvolatile memory such as ROM. A host connected to system 500 may transmit or receive data with nonvolatile memory device 10 through memory controller 520 and host interface 540. Memory controller 520 may perform the function of a memory interface, for example.

System 500 may include an error correction code (ECC) block 530. ECC block 530 may operate under control of CPU 510 and may detect and correct an error included in data read from nonvolatile memory device 10 through memory interface 520. CPU 510 may control data exchange among memory controller 520, ECC block 530, host interface 540 and memory device 550 through bus 501, for example. System 500 may be included in a Universal Serial Bus (USB) memory drive or a memory stick, for example.

Figure 13:
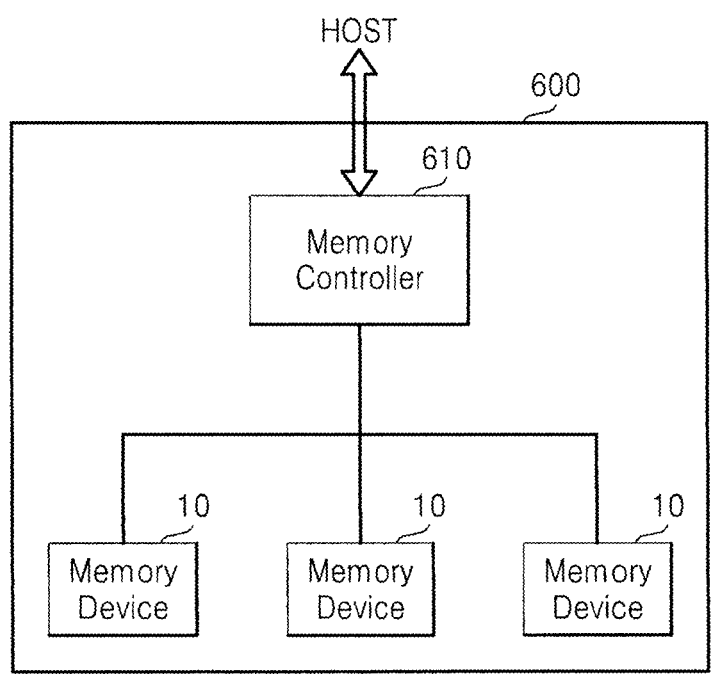
FIG. 13 is still another exemplary embodiment in accordance with principles of inventive concepts of the memory system including the nonvolatile memory device illustrated in FIG. 1.

In an exemplary embodiment in accordance with principles of infinite concepts, as illustrated in FIG. 13, a system includes a nonvolatile memory device, as described in the discussion related to FIG. 1. System 600 may be included in a data storage device such as a solid state drive (SSD), for example. System 600 may include a plurality of nonvolatile memory devices 10 and a memory controller 610, which may control a data processing operation of each of a plurality of nonvolatile memory devices 10. System 600 may be included in a memory module.

Figure 14:
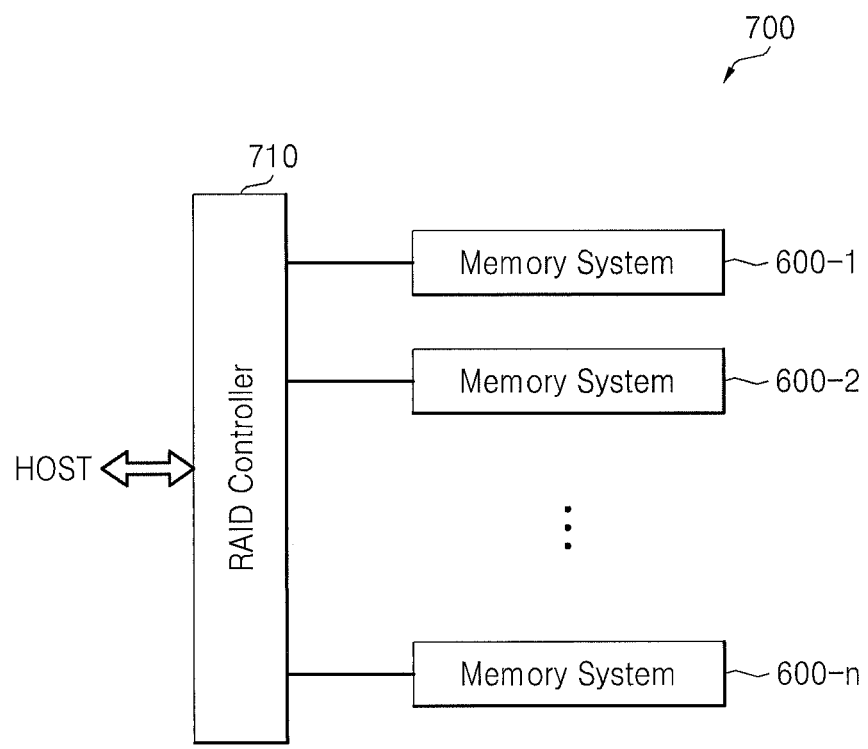
FIG. 14 is an exemplary embodiment in accordance with principles of inventive concepts of a data processing device including the memory system illustrated in FIG. 13.

FIG. 14 is an exemplary embodiment of a data processing device that includes a memory system such as described in the description related to FIG. 13. Referring to FIGS. 13 and 14, data storage device 700, which may be implemented as a redundant array of independent disks (RAID) system, may include a RAID controller 710 and a plurality of modules 600-1 to 600-*n*, where n is an integer.

Each of the memory modules 600-1 to 600-*n* may be implemented as a memory system 600 as described in the discussion related to FIG. 13. Memory modules 600-1 to 600-*n* may form a RAID array. Data storage device 700 may be included in a personal computer (PC) or a SSD, for example.

During a program operation, RAID controller 710 may output program data, output from a host according to a program command output from the host, to one of memory modules 600-1 to 600-*n* according to a RAID level. During a read operation, RAID controller 710 may transmit data, read from one of memory modules 600-1 to 600-*n* according to a read command output from a host.

A nonvolatile memory device according to exemplary embodiments in accordance with principles of inventive concepts may secure reliability of nonvolatile memory device and reduce area overhead of nonvolatile memory device by embodying an authentication key and a configuration element of the authentication key in a memory cell array of the nonvolatile memory device.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A nonvolatile memory device comprising:
a plurality of nonvolatile memory cells divided into partitions, each partition associated with a local bit line selection circuit;
each partition including a plurality of nonvolatile memory cells, each of the plurality of memory cells connected to one of a plurality of local bit lines and one of a plurality of word lines;
a plurality of write global bit lines;
a plurality of read global bit lines;
each local bit line selection circuit configured to control connection between the plurality of local bit lines within a partition and one of the write global bit lines and to control connection between the plurality of local bit lines within a partition and one of the read global bit lines according to a corresponding plurality of local bit line selection signals; and
a Y-gating circuit configured to control connection between a write global bit line and a write driver block and to control connection between a read global bit line and a sense amplifier in response to the value of global bit line selection signals;
wherein the sense amplifier and write driver block supply write data to the Y-gating circuit during a write operation or sense-amplifies read data output from the Y-gating circuit during a read operation;
wherein a first plurality of the nonvolatile memory cells within a partition are configured to store an authentication key and data which the authentication key is configured to secure;
wherein a second plurality of the nonvolatile memory cells within the partition are configured to store authentication key configuration information configurable to indicate whether a securing mechanism requiring the authentication key is enabled;

wherein the authentication key configuration information comprises an authentication enable bit for enabling the authentication key; and wherein the authentication key configuration information comprises a lock down bit for locking the authentication key and the authentication enable bit.

2. The device of claim 1, further comprising a control circuit that includes a register where the nonvolatile memory device is configured to copy and store the authentication key and the authentication key configuration information from the first plurality of nonvolatile memory cells and the second plurality of nonvolatile memory cells in response to a reset.

3. The device of claim 1, further comprising a control circuit that includes a register where the nonvolatile memory device is configured to copy and store the authentication key and the authentication key configuration information from the first plurality of nonvolatile memory cells and the second plurality of nonvolatile memory cells in response to an external command.

4. The device of claim 1, wherein the nonvolatile memory device is a phase change random access memory (PRAM).

5. A system comprising:
a nonvolatile memory device; and
a memory controller configured to control the nonvolatile memory device, wherein the nonvolatile memory device comprises:
  a plurality of nonvolatile memory cells divided into partitions, each partition associated with a local bit line selection circuit;
  each partition including a plurality of nonvolatile memory cells, each of the plurality of memory cells connected to one of a plurality of local bit lines and one of a plurality of word lines;
  a plurality of write global bit lines;
  a plurality of read global bit lines;
  each local bit line selection circuit configured to control connection between the plurality of local bit lines within a partition and one of the write global bit lines and to control connection between the plurality of local bit lines within a partition and one of the read global bit lines according to a corresponding plurality of local bit line selection signals; and
  a Y-gating circuit configured to control connection between a write global bit line and a write driver block and to control connection between a read global bit line and a sense amplifier in response to the value of global bit line selection signals;
  wherein the sense amplifier and write driver block supply write data to the Y-gating circuit during a write operation or sense-amplifies read data output from the Y-gating circuit during a read operation;
  a plurality of nonvolatile memory cells arranged in partitions to be accessed by row and column addresses, with partitions defined by local bit-line subsets associated with the row or column addresses,
  a first plurality of nonvolatile memory cells within a partition configured to store an authentication key and data which the authentication key is configured to secure in the same partition as the data;
  a second plurality of nonvolatile memory cells within the partition are configured to store authentication key configuration information configurable to indicate whether a securing mechanism requiring the authentication key is enabled;

wherein the authentication key configuration information comprises an authentication enable bit for enabling the authentication key; and wherein the authentication key configuration information comprises a lock down bit for locking the authentication key and the authentication enable bit.

6. The system of claim 5, wherein the nonvolatile memory device is a phase change random access memory (PRAM).

7. The system of claim 5, wherein the memory system is a memory card.

8. The system of claim 5, wherein the memory system is a multi-chip package.

9. The system of claim 5, wherein the memory system is a smart phone or tablet PC.

10. The system of claim 5, wherein the memory system is a universal serial bus memory drive.

11. A method, comprising:
storing in a nonvolatile memory, the memory comprising:
  a plurality of nonvolatile memory cells divided into partitions, each partition associated with a local bit line selection circuit;
  each partition including a plurality of nonvolatile memory cells, each of the plurality of memory cells connected to one of a plurality of local bit lines and one of a plurality of word lines;
  a plurality of write global bit lines;
  a plurality of read global bit lines;
  each local bit line selection circuit configured to control connection between the plurality of local bit lines within a partition and one of the write global bit lines and to control connection between the plurality of local bit lines within a partition and one of the read global bit lines according to a corresponding plurality of local bit line selection signals; and
  a Y-gating circuit configured to control connection between a write global bit line and a write driver block and to control connection between a read global bit line and a sense amplifier in response to the value of global bit line selection signals;
  wherein the sense amplifier and write driver block supply write data to the Y-gating circuit during a write operation or sense-amplifies read data output from the Y-gating circuit during a read operation;
storing an authentication key and data which the authentication key is configured to secure in a first plurality of the plurality of nonvolatile memory cells within the partition; and
storing authentication key configuration information to indicate whether a securing mechanism requiring the authentication key is enabled in a second plurality of the plurality of nonvolatile memory cells;
wherein the step of storing the authentication key configuration information comprises storing an authentication enable bit for enabling the authentication key; and
wherein the step of storing the authentication key configuration information comprises storing a lock down bit for locking the authentication key and the authentication enable bit.

12. The method of claim 11, further comprising copying and storing the authentication key and the authentication key configuration information from the first plurality of nonvolatile memory cells and the second plurality of nonvolatile memory cells in response to a reset.

* * * * *